J. ORD.
Reversing-Gear for Locomotives.
No. 167,468. Patented Sept. 7, 1875.
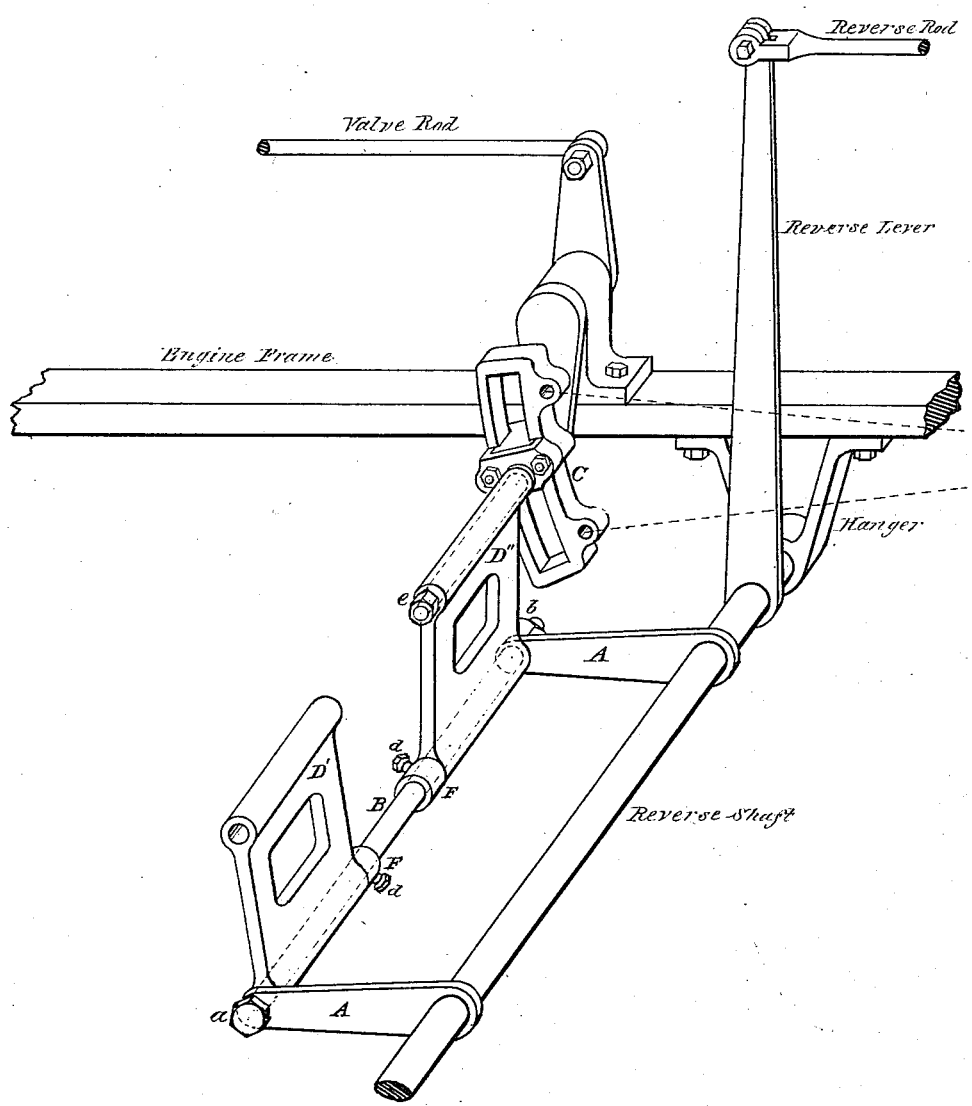
Witnesses.
Josiah W. Ells
Geo. C. Stewart
Inventor.
Jonathan Ord.

UNITED STATES PATENT OFFICE.

JONATHAN ORD, OF PITTSBURG, PENNSYLVANIA.

IMPROVEMENT IN REVERSING-GEARS FOR LOCOMOTIVES.

Specification forming part of Letters Patent No. 167,468, dated September 7, 1875; application filed January 25, 1875.

*To all whom it may concern:*

Be it known that I, JONATHAN ORD, of Pittsburg, in the county of Allegheny and State of Pennsylvania, have invented a new and useful Mode or Means of Supporting the Radial Links used in the Reversing-Gear of Locomotive-Engines, of which the following is a specification:

Heretofore each radial link has been hung to the unsupported single extremity, and on one side of its appropriate lifting-arm, by very short bearings, which soon become so worn and loose by the violent action and great weight of the link and eccentric-rods, together with the spring of the arm, as to incline the link out of a line perpendicular to the axis of the reverse shaft, producing thereby such friction as rapidly destroys the operative parts of the links and their immediate attachments, unfitting them for continued or long usage, making them unsafe, and frequently requiring expensive repairs.

My invention consists in connecting the extremities of the lifting-arm by means of a horizontal rod that prevents them from twisting, and forms a long support for the link-carriers in such a manner as that the hereinbefore-mentioned difficulties are to a very great extent avoided, if not wholly overcome.

My invention will be readily understood from the following description, taken in connection with the accompanying drawing, which represents an isometrical perspective view of my improvement.

The several parts shown in this drawing are similar to those in general use, with this exception, that instead of each radial link C being dependent for its support wholly upon the extremity of a single lifting-arm, A, and that, as a necessity, in very short bearings, I have connected the projecting ends of the lifting-arms A A by means of a horizontal rod, B, which rod extends through both arms, and is secured in place by a head, $a$, at one end, and nut $b$ at the other, and which strengthens the parts in such a manner as to prevent undue vibration, lateral spring, and much unnecessary wear, and at the same time afford a long and steady bearing for the vibrating carriers, which, in this case, can be made unusually wide and correspondingly strong. In the upper part of these carriers D' D'' the long journal of the radial links C work, and are secured therein against end play by an appropriate nut, $e$, at the outer projection, while on the rod B and against each carrier D' D'' is a collar, F, to hold the carriers and prevent their sliding on the rod, and which are made adjustable by means of short pinch-screws $d$ $d$; or any other plan may be used for the same purpose.

I claim—

The connecting-rod B, in combination with the lifting-arms A A, carriers D' D'', and radial link C, as and for the purposes set forth.

JONATHAN ORD.

Witnesses:
 JOSIAH W. ELLS,
 GEO. C. STEWART.